US011918836B2

(12) United States Patent
Rohrig

(10) Patent No.: US 11,918,836 B2
(45) Date of Patent: Mar. 5, 2024

(54) MAGNETIC PASS-THROUGH CONTROL OF IN-HELMET DISPLAY

(71) Applicant: Hamilton Sundstrand Corporation, Charlotte, NC (US)

(72) Inventor: Jake Rohrig, Simsbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 328 days.

(21) Appl. No.: 17/496,877

(22) Filed: Oct. 8, 2021

(65) Prior Publication Data
US 2023/0116064 A1 Apr. 13, 2023

(51) Int. Cl.
| | |
|---|---|
| G02B 27/01 | (2006.01) |
| A43B 3/00 | (2022.01) |
| A62B 18/08 | (2006.01) |
| B64G 6/00 | (2006.01) |
| F41H 1/04 | (2006.01) |
| G02B 7/00 | (2021.01) |
| B64D 11/00 | (2006.01) |

(52) U.S. Cl.
CPC ............. *A62B 18/08* (2013.01); *B64G 6/00* (2013.01); *G02B 7/006* (2013.01); *G02B 27/0176* (2013.01); *A43B 3/00* (2013.01); *B64D 11/0015* (2013.01); *F41H 1/04* (2013.01); *G02B 2027/0169* (2013.01); *G02B 27/017* (2013.01); *G02B 2027/0198* (2013.01)

(58) Field of Classification Search
CPC .. A42B 1/08; A42B 3/06; A42B 3/066; A42B 3/00; A42B 3/228; F41H 1/04; G02B 27/017; G02B 27/0176

USPC .......... 248/683, 467, 206.5, 309.4; 2/410, 5, 2/6.1, 6.2, 6.3, 6.6, 6.8, 7, 8.2, 422
See application file for complete search history.

(56) References Cited

U.S. PATENT DOCUMENTS

| | | | |
|---|---|---|---|
| 5,506,730 A * | 4/1996 | Morley | A42B 3/04 2/6.2 |
| 6,472,776 B1 * | 10/2002 | Soto | G02B 23/125 307/400 |
| 9,323,056 B2 | 4/2016 | Williams | |
| 9,720,233 B2 | 8/2017 | Dopilka et al. | |
| 2004/0181855 A1 * | 9/2004 | Prendergast | A42B 3/04 2/422 |

(Continued)

OTHER PUBLICATIONS

European Search Report for Application No. 22196107.1, dated Feb. 23, 2023, 37 pages.

*Primary Examiner* — Alfred J Wujciak
(74) *Attorney, Agent, or Firm* — CANTOR COLBURN LLP

(57) ABSTRACT

A magnetic pass-through controller of an in-helmet display includes internal components inside a helmet. The internal components include a magnet assembly holding one or more internal magnets and a swing arm affixed to the magnet assembly and affixed to the in-helmet display. External components outside the helmet include an external magnet housing holding one or more external magnets and an adjuster for manual rotation. The adjuster is coupled to the external magnet housing such that the manual rotation of the adjuster causes a corresponding rotation of the external magnet housing. Magnetic coupling between the one or more internal magnets and the one or more external magnets causes the corresponding rotation also in the magnet assembly and the swing arm.

20 Claims, 4 Drawing Sheets

(56) References Cited

U.S. PATENT DOCUMENTS

2016/0124227 A1* 5/2016 Zhang ............... G02B 27/0176
345/8
2020/0393680 A1 12/2020 Högstedt et al.

\* cited by examiner

MAGNETIC PASS-THROUGH CONTROL OF IN-HELMET DISPLAY

BACKGROUND

Exemplary embodiments pertain to the art of displays and, in particular, to magnetic pass-through control of an in-helmet display.

In some environments, a helmet is used not only for protection against impacts but also to maintain a habitable environment. In a space application, for example, a helmet is an essential component of an extravehicular mobility unit (EMU), which also includes a full body suit supplied by an oxygen tank, that maintains an environment that sustains the astronaut. Situational awareness may be improved by an in-helmet display that presents information to the wearer. However, adjustment of this display by removing the helmet is not possible while retaining the habitable environment for the wearer.

BRIEF DESCRIPTION

In one exemplary embodiment, a magnetic pass-through controller of an in-helmet display includes internal components inside a helmet. The internal components include a magnet assembly holding one or more internal magnets, and a swing arm affixed to the magnet assembly and affixed to the in-helmet display. The controller also includes external components outside the helmet. The external components include an external magnet housing holding one or more external magnets, and an adjuster for manual rotation and coupled to the external magnet housing such that the manual rotation of the adjuster causes a corresponding rotation of the external magnet housing. Magnetic coupling between the one or more internal magnets and the one or more external magnets causes the corresponding rotation also in the magnet assembly and the swing arm.

In addition to one or more of the features described herein, the controller also includes an internal mounting bracket affixed to an inner surface of the helmet.

In addition to one or more of the features described herein, the internal mounting bracket is coupled to the magnet assembly via a retaining pin configured to allow the corresponding rotation of the magnet assembly while the internal mounting bracket remains fixed.

In addition to one or more of the features described herein, the controller also includes a fastener housing affixed to an outer surface of the helmet on one side.

In addition to one or more of the features described herein, the controller also includes a retaining spring to couple the fastener housing to the external magnet housing.

In addition to one or more of the features described herein, the controller also includes fasteners within the fastener housing to be released and separate the fastener housing based on a pull of the adjuster away from the helmet.

In addition to one or more of the features described herein, the manual rotation of the adjuster is prevented until the pull of the adjuster to release the fasteners.

In addition to one or more of the features described herein, the fastener housing is fixed on a side closest to the helmet to undergo the corresponding rotation on a side closest to the adjuster based on the fasteners being released.

In addition to one or more of the features described herein, the one or more internal magnets and the one or more external magnets are decoupled from each other based on a predetermined impact force.

In addition to one or more of the features described herein, the one or more internal magnets and the one or more external magnets are re-coupled based on being aligned after being decoupled.

In another exemplary embodiment, a method of assembling a magnetic pass-through controller of an in-helmet display includes arranging internal components inside a helmet. The internal components include a magnet assembly holding one or more internal magnets and a swing arm affixed to the magnet assembly and affixed to the in-helmet display. The method also includes arranging external components outside the helmet. The external components include an external magnet housing holding one or more external magnets, and an adjuster configured for manual rotation and coupled to the external magnet housing such that the manual rotation of the adjuster causes a corresponding rotation of the external magnet housing. Magnetic coupling between the one or more internal magnets and the one or more external magnets causes the corresponding rotation also in the magnet assembly and the swing arm.

In addition to one or more of the features described herein, the method also includes affixing an internal mounting bracket 260 to an inner surface of the helmet.

In addition to one or more of the features described herein, the method also includes coupling the internal mounting bracket to the magnet assembly via a retaining pin to allow the corresponding rotation of the magnet assembly while the internal mounting bracket remains fixed.

In addition to one or more of the features described herein, the method also includes affixing a fastener housing to an outer surface of the helmet on one side.

In addition to one or more of the features described herein, the method also includes coupling the fastener housing to the external magnet housing using a retaining spring.

In addition to one or more of the features described herein, the method also includes configuring fasteners within the fastener housing to be released and separate the fastener housing based on a pull of the adjuster away from the helmet.

In addition to one or more of the features described herein, the configuring the fasteners includes preventing manual rotation of the adjuster until the pull of the adjuster to release the fasteners.

In addition to one or more of the features described herein, the method also includes fixing the fastener housing on a side closest to the helmet such that, based on the fasteners being released, the fastener housing undergoes the corresponding rotation on a side closest to the adjuster.

In addition to one or more of the features described herein, the arranging the internal components and the arranging the external components is such that the one or more internal magnets and the one or more external magnets decouple from each other based on a predetermined impact force.

In addition to one or more of the features described herein, the arranging the internal components and the arranging the external components is such that the one or more internal magnets and the one or more external magnets re-couple based on being aligned after being decoupled.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an in-helmet display can provide information to a wearer of the helmet. However, when the helmet is part of an EMU, for example, that maintains an environment, then adjusting the in-helmet display presents a challenge. Embodiments of the systems and methods detailed herein relate to magnetic pass-through control of an in-helmet display. The magnetic pass-through control facilitates control of the position of the in-helmet display from outside the helmet, thereby preventing the need to remove the helmet. As opposed to a pass-through control without the magnetic feature, the magnetic pass-through control additionally provides a safety feature. An impact that breaks the magnetic contact between the outside and inside of the helmet results in the in-helmet display falling away from the face of the wearer.

While an EMU and a space application are specifically discussed for explanatory purposes, applications for the magnetic pass-through control of an in-helmet display according to one or more embodiments also include underwater (e.g., in an atmospheric diving suit), earth-based (e.g., in a hazmat suit or contamination suit), high-altitude (e.g., in a flight suit), and sub-surface applications. Generally, the suit that includes the helmet to maintain a habitable environment is referred to as an atmospheric suit.

Figure 1:
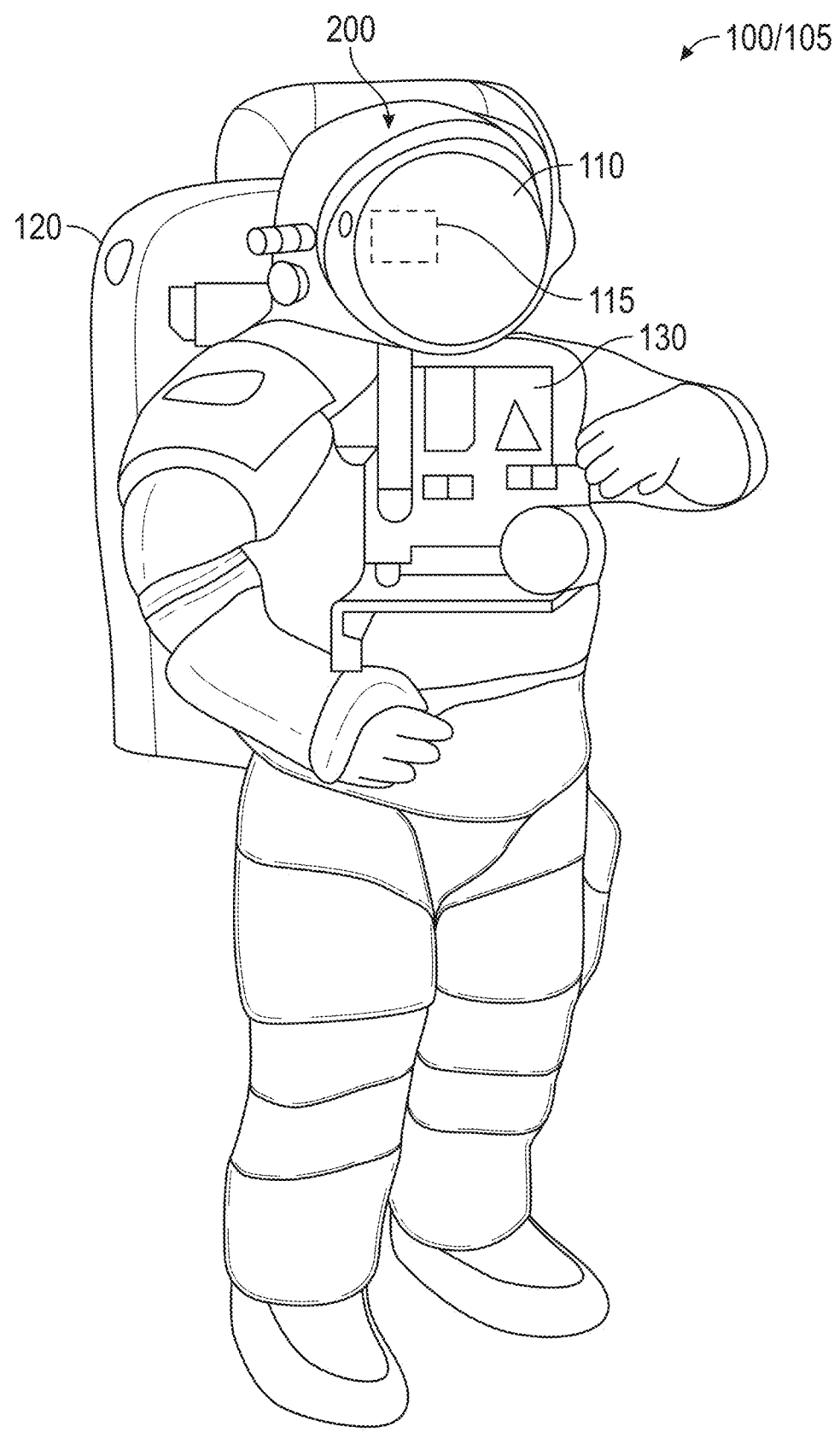
FIG. 1 shows an atmospheric suit with a magnetic pass-through controller of an in-helmet display according to one or more embodiments.

FIG. 1 shows an atmospheric suit 100 with a magnetic pass-through controller 200 of an in-helmet display 115 according to one or more embodiments. The exemplary atmospheric suit 100 shown in FIG. 1 is an EMU 105. The EMU 105 includes a helmet 110 with an in-helmet display 115. The magnetic pass-through controller 200 that facilitates changing a position of the in-helmet display 115 without removing the helmet 110 is further detailed with reference to FIG. 2. Systems that are affixed as part of the EMU 105 include a primary life support system (PLSS) 120 and a display and control module (DCM) 130. These systems 120, 130, along with components of the EMU 105, create a habitable environment for a wearer performing extravehicular activity in space.

Figure 2:
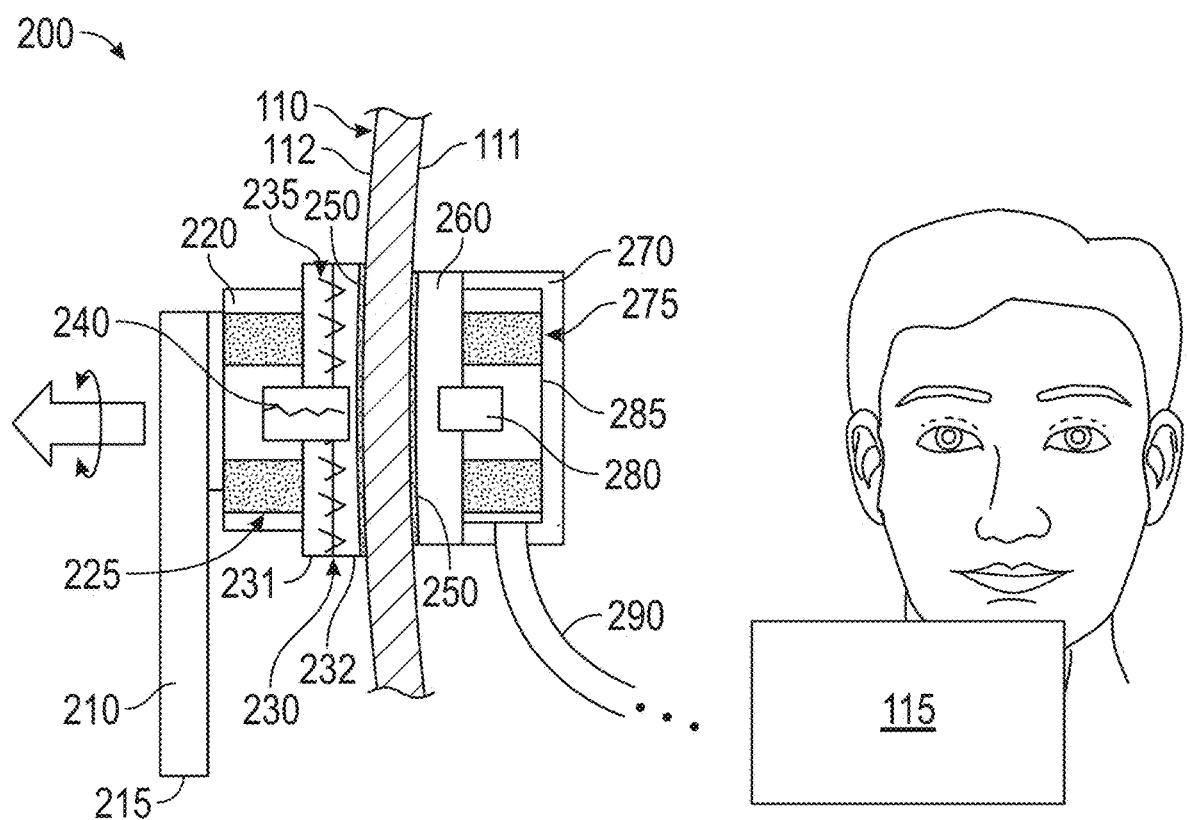
FIG. 2 details the magnetic pass-through controller according to one or more embodiments.

FIG. 2 details the magnetic pass-through controller 200 according to one or more embodiments. A cross-sectional view of the helmet 110 is shown, and a face of a wearer within the helmet 110 is used to indicate an exemplary position of the pass-through controller 200 relative to the wearer. That is, the pass-through controller 200 is close to the right ear of the wearer and straddles both sides of the transparent bubble of the helmet 110. This exemplary illustration is not intended to limit the position of the magnetic pass-through controller 200. According to alternate embodiments, the magnetic pass-through controller 200 may be close to the left ear of the wearer or elsewhere.

On the outside of the helmet 110, an adjuster 210 (e.g., lever, knob) may be rotated to affect a corresponding rotation in a swing arm 290 inside the helmet 110 that has a fixed attachment relationship with in-helmet display 115. According to the orientation shown in FIG. 2, the adjuster 210 may be rotated counter-clockwise such that the edge 215 of the lever shown as the exemplary adjuster 210 moves toward the front of the wearer (i.e., out of the plane shown). Alternately, the adjuster 210 may be rotated clockwise such that the edge 215 of the level moves toward the back of the wearer (i.e., into the plane shown). Based on the arrangement of the swing arm 290 and in-helmet display 115, a counter-clockwise rotation of the adjuster 210 would raise the in-helmet display 115 from the position shown in FIG. 2 to a higher position (e.g., in front of the right eye of the wearer). Similarly, a clockwise rotation of the adjuster 210 would lower the in-helmet display 115.

The adjuster 210 is coupled to an external magnet housing 220 with one or more external magnets 225. The attachment between the adjuster 210 and external magnet housing 220 is fixed (i.e., they do not move relative to each other). The external magnet housing 220 is affixed to an external fastener housing 230 with fasteners 235 (e.g., locking teeth) that allow the fastener housing 230 to separate.

That is, pulling (away from the helmet 110) on the adjuster 210 causes the outer portion 231 of the fastener housing 230, which is closest to the adjuster 210, to pull away from the inner portion 232, which is the side of the fastener housing 230 closest to the helmet 110. A retaining spring 240 provides resistance to pulling the fastener housing 230 by pulling on the adjuster 210 and, based on release of the adjuster 210, pulls the outer portion 231 back together with the inner portion 232. Because of this, the outer portion 231 of the fastener housing 230 has a fixed relationship with movement of the adjuster 210 but the inner portion 232 of the fastener housing 230 does not move but, instead, remains in a fixed position relative to the helmet 110. The fastener housing 230 is affixed to an outer surface 112 of the helmet 110 by affixing material 250 (e.g., adhesive, bonding material).

On the inside of the helmet, affixing material 250 affixes an internal mounting bracket 260 to an inner surface 111 of the helmet 110. A housing 270 attached to the internal mounting bracket 260 houses one or more internal magnets 275 in a magnet assembly 285. A retaining pin 280 holds the internal mounting bracket 260 and magnet assembly 285 together. More specifically, the retaining pin 280 allows the magnet assembly 285 to rotate relative to the internal mounting bracket 260. The swing arm 290 has a fixed attachment to the magnet assembly 285 and, as previously noted, the other end of the swing arm 290 has a fixed attachment to the in-helmet display 115.

The rotation of the adjuster 210 outside the helmet 110 is matched by rotation of the swing arm 290 inside the helmet and, correspondingly, by rotation of the in-helmet display 115. This pass-through control of the swing arm 290 inside the helmet 110 via adjustment of the adjuster 210 outside the helmet is facilitated by the external magnets 225 and the internal magnets 275. Specifically, the internal magnets 275 are magnetically coupled to the external magnets 225.

When the adjuster 210 is pulled, this also pulls the fasteners 235 that hold together the fastener housing 230 and prevent relative rotation between the inner portion 232 and outer portion 231 of the fastener housing 230. Subsequently, rotation of the adjuster 210 outside the helmet results in the same rotation of the external magnet housing 220 and the outer portion 231 of the fastener housing 230. Following adjustment of the adjuster 210 as needed, releasing the adjuster 210 results in the outer portion 231 of the fastener housing 230 moving (toward the helmet 110) to re-engage with the inner portion 232 of the fastener housing 230 with the fasteners 235 locking the portions 231, 232 together to prevent additional rotation.

Because the external magnets 225 within the external magnet housing 220 are magnetically coupled to the internal magnets 275, the internal magnets 275 and, thus, the magnet assembly 285 rotates in the same way as the adjuster 210. The retaining pin 280 allows the magnet assembly 285 to rotate while the internal mounting bracket 260 stays affixed to the helmet 110. The swing arm 290 that is attached to the magnet assembly 285 also rotates in the same way as the adjuster 210. Thus, the magnetic coupling between the external magnets 225 and the internal magnets 275 allows movement of the adjuster 210 outside the helmet 110 to affect movement of the swing arm 290 inside the helmet 110.

The number of external magnets 225 and the number of internal magnets 275 may be the same and the external magnets 225 and internal magnets 275 may be arranged to line up with each other. The number, arrangement, and strength of the magnets 225, 275 may be selected within a minimum and maximum magnetic coupling range. The minimum magnetic coupling used to select the number, arrangement, and strength of the magnets 225, 275 may be such that adjustment of the adjuster 210 does result in the same adjustment of the swing arm 290. The maximum magnetic coupling used to select the number, arrangement, and strength of the magnets 225, 275 may be such that the coupling is broken based on an expected impact force, as further described.

One of the advantages of the magnetic pass-through controller 200, as compared with a mechanical pass-through controller that has a physical connection between an outer adjuster and inner swing arm, is the ability to break and restore the connection. During an impact event (e.g., wearer has fallen), moving the in-helmet display 115 away from the face and, specifically, the eye of the wearer may prevent injury to the wearer within the helmet 110.

According to one or more embodiments, the magnetic coupling between the external magnets 225 and internal magnets 275 is such that an impact results in a break of the magnetic coupling. As a result, the swing arm 290 and, thus, the in-helmet display 115 drop (e.g., to the position shown in FIG. 2). To re-engage the magnetic coupling, the adjuster 210 is pulled to disengage the fasteners 235 and the external magnet housing 220 is rotated (via rotation of the adjuster 210) until the external magnets 225 align and, thus, magnetically couple again with the internal magnets 275.

Figure 3A:
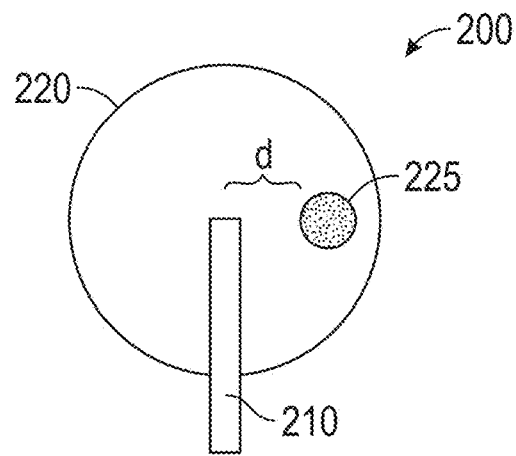
FIG. 3A shows an exemplary arrangement of an external magnet of a magnetic pass-through controller according to one or more embodiments.
Figure 3B:
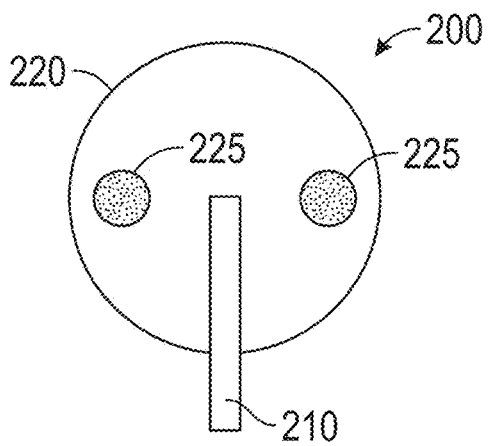
FIG. 3B shows an exemplary arrangement of two external magnets of a magnetic pass-through controller according to one or more embodiments.
Figure 3C:
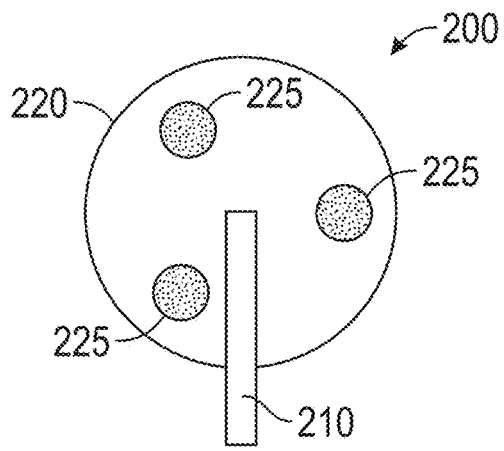
FIG. 3C shows an exemplary arrangement of three external magnets of a magnetic pass-through controller according to one or more embodiments.

FIGS. 3A, 3B, and 3C show exemplary arrangements of the external magnets 225 of a magnetic pass-through controller 200 according to one or more embodiments. In each of the figures, the external magnet housing 220 is shown shaped as a disk and the external magnets 225 are shown with a circular cross-sectional shape. However, the external magnet housing 220 and the external magnets 225 may have other shapes according to alternate embodiments. A lever is indicated as the adjuster 210. As previously noted, the size, strength, and arrangement of the external magnets 225 may be matched by the internal magnets 275.

FIG. 3A shows an arrangement with one external magnet 225. The distance d by which the external magnet 225 is offset from the axis of rotation of the external magnet housing 220, as well as the size and strength of the external magnet 225, may be selected to create the requisite leverage to rotate the swing arm 290 inside the helmet 110 (i.e., to meet a minimum magnetic coupling between the external and internal magnets 225, 275). At the same time, the magnetic coupling between the external and internal magnets 225, 275 may be limited to facilitate decoupling during an impact. FIG. 3B illustrates an arrangement with two external magnets 225, and FIG. 3C illustrates an arrangement with three external magnets 225. Alternate embodiments may include additional external magnets 225.

Figure 4A:
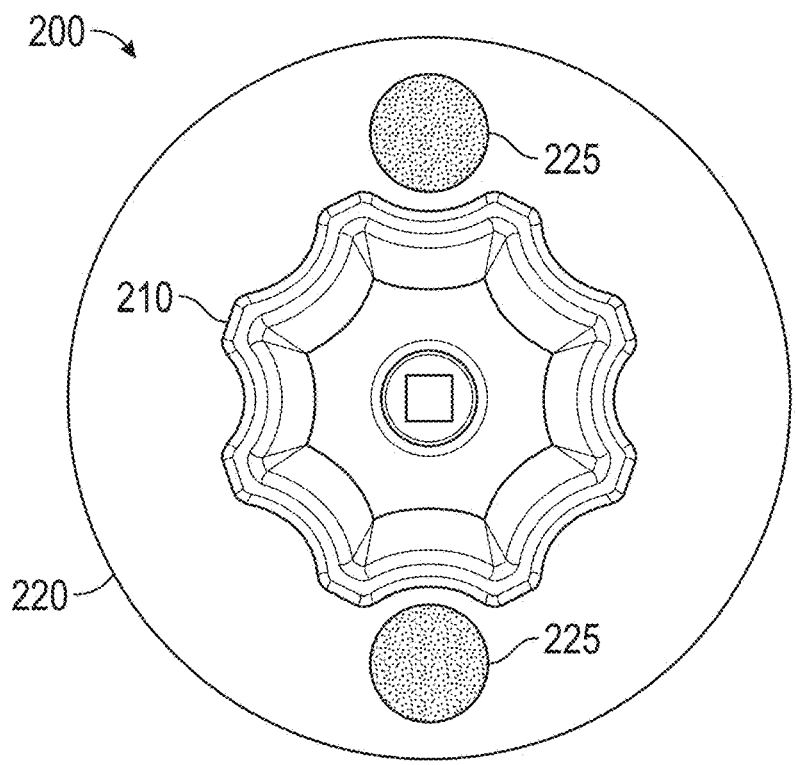
FIG. 4A depicts a view of aspects of a magnetic pass-through controller according to one or more embodiments.
Figure 4B:
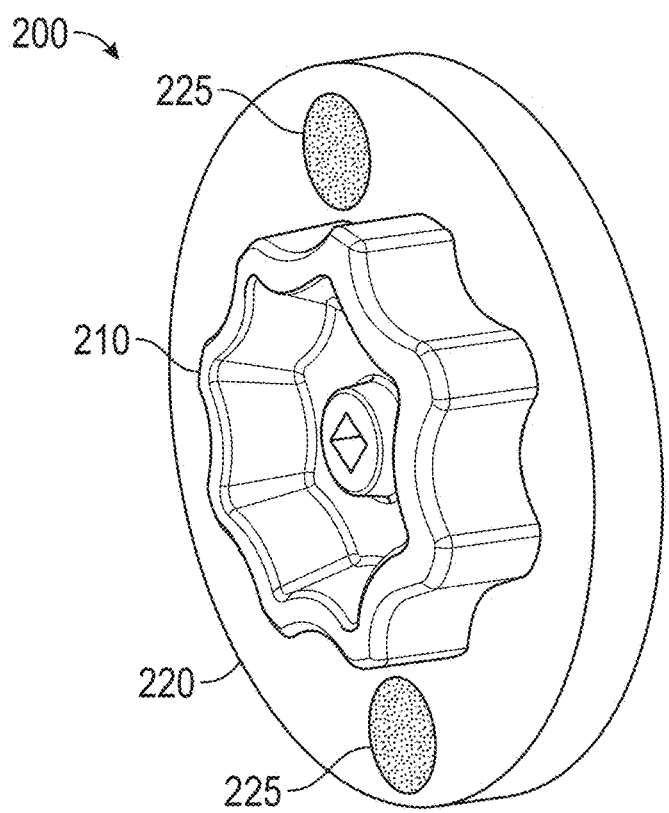
FIG. 4B depicts an isometric view of aspects of the magnetic pass-through controller shown in FIG. 4A.

FIG. 4A depicts a view of aspects of a magnetic pass-through controller 200 according to one or more embodiments. An external magnet housing 220 with two external magnets 225 is shown. The exemplary adjuster 210 is a knob that can be rotated clockwise and counter-clockwise like the lever shown in FIG. 2. As previously noted, rotation may be prevented until the adjuster 210 is first pulled away from the helmet 110 to disengage the fasteners 235 that hold the inner portion 232 and outer portion 231 of the fastener housing 230 together and prevent relative rotation of the portions 231, 232. FIG. 4B depicts an isometric view of aspects of the magnetic pass-through controller 200 shown in FIG. 4A.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A magnetic pass-through controller of an in-helmet display, the controller comprising:
   internal components inside a helmet comprising:
      a magnet assembly holding one or more internal magnets, and
      a swing arm affixed to the magnet assembly and affixed to the in-helmet display; and
   external components outside the helmet comprising:
      an external magnet housing holding one or more external magnets, and an adjuster configured for manual rotation and coupled to the external magnet housing such that the manual rotation of the adjuster causes a corresponding rotation of the external magnet housing, wherein magnetic coupling between the one or more internal magnets and the one or more external magnets causes the corresponding rotation also in the magnet assembly and the swing arm.

2. The controller according to claim 1, further comprising an internal mounting bracket affixed to an inner surface of the helmet.

3. The controller according to claim 2, wherein the internal mounting bracket is coupled to the magnet assembly via a retaining pin configured to allow the corresponding rotation of the magnet assembly while the internal mounting bracket remains fixed.

4. The controller according to claim 1, further comprising a fastener housing affixed to an outer surface of the helmet on one side.

5. The controller according to claim 4, further comprising a retaining spring configured to couple the fastener housing to the external magnet housing.

6. The controller according to claim 5, further comprising fasteners within the fastener housing configured to be released and separate the fastener housing based on a pull of the adjuster away from the helmet.

7. The controller according to claim 6, wherein the manual rotation of the adjuster is prevented until the pull of the adjuster to release the fasteners.

8. The controller according to claim 6, wherein the fastener housing is configured to be fixed on a side closest to the helmet and to undergo the corresponding rotation on a side closest to the adjuster based on the fasteners being released.

9. The controller according to claim 1, wherein the one or more internal magnets and the one or more external magnets are configured to decouple from each other based on a predetermined impact force.

10. The controller according to claim 9, wherein the one or more internal magnets and the one or more external magnets are configured to be re-coupled based on being aligned after being decoupled.

11. A method of assembling a magnetic pass-through controller of an in-helmet display, the method comprising:
arranging internal components inside a helmet, the internal components including a magnet assembly holding one or more internal magnets and a swing arm affixed to the magnet assembly and affixed to the in-helmet display; and
arranging external components outside the helmet, the external components including an external magnet housing holding one or more external magnets, and an adjuster configured for manual rotation and coupled to the external magnet housing such that the manual rotation of the adjuster causes a corresponding rotation of the external magnet housing, wherein magnetic coupling between the one or more internal magnets and the one or more external magnets causes the corresponding rotation also in the magnet assembly and the swing arm.

12. The method according to claim 11, further comprising affixing an internal mounting bracket 260 to an inner surface of the helmet.

13. The method according to claim 12, further comprising coupling the internal mounting bracket to the magnet assembly via a retaining pin configured to allow the corresponding rotation of the magnet assembly while the internal mounting bracket remains fixed.

14. The method according to claim 11, further comprising affixing a fastener housing to an outer surface of the helmet on one side.

15. The method according to claim 14, further comprising coupling the fastener housing to the external magnet housing using a retaining spring.

16. The method according to claim 15, further comprising configuring fasteners within the fastener housing to be released and separate the fastener housing based on a pull of the adjuster away from the helmet.

17. The method according to claim 16, wherein the configuring the fasteners includes preventing manual rotation of the adjuster until the pull of the adjuster to release the fasteners.

18. The method according to claim 16, further comprising fixing the fastener housing on a side closest to the helmet such that, based on the fasteners being released, the fastener housing undergoes the corresponding rotation on a side closest to the adjuster.

19. The method according to claim 11, wherein the arranging the internal components and the arranging the external components is such that the one or more internal magnets and the one or more external magnets decouple from each other based on a predetermined impact force.

20. The method according to claim 19, wherein the arranging the internal components and the arranging the external components is such that the one or more internal magnets and the one or more external magnets re-couple based on being aligned after being decoupled.

* * * * *